United States Patent
Kunz (10) Patent No.: US 11,308,179 B2
(45) Date of Patent: Apr. 19, 2022

(54) CORE DATA SERVICE-BASED COMPILE TIME WEBPAGE GENERATION

(71) Applicant: SAP SE, Walldorf (DE)

(72) Inventor: David Kunz, Schwetzingen (DE)

(73) Assignee: SAP SE, Walldorf (DE)

( * ) Notice: Subject to any disclaimer, the term of this patent is extended or adjusted under 35 U.S.C. 154(b) by 36 days.

(21) Appl. No.: 16/874,469

(22) Filed: May 14, 2020

(65) Prior Publication Data

US 2021/0357474 A1    Nov. 18, 2021

(51) Int. Cl.
*G06F 16/958* (2019.01)
*G06F 16/957* (2019.01)

(52) U.S. Cl.
CPC ........ *G06F 16/972* (2019.01); *G06F 16/9577* (2019.01); *G06F 16/986* (2019.01)

(58) Field of Classification Search
None
See application file for complete search history.

(56) References Cited

U.S. PATENT DOCUMENTS

| | | | |
|---|---|---|---|
| 2013/0227388 A1* | 8/2013 | Trunley | G06F 9/4552 715/234 |
| 2014/0149850 A1* | 5/2014 | Khorashadi | G06F 16/9577 715/235 |
| 2015/0142781 A1* | 5/2015 | Nigam | G06F 16/243 707/722 |
| 2015/0161235 A1* | 6/2015 | Libfeld | G06F 16/252 707/607 |
| 2016/0308974 A1* | 10/2016 | Chadzelek | H04L 67/02 |
| 2017/0329581 A1* | 11/2017 | Jann | G06F 8/38 |
| 2019/0222619 A1* | 7/2019 | Shribman | H04L 67/02 |
| 2019/0324881 A1* | 10/2019 | Buffone | H04L 67/02 |
| 2020/0110793 A1* | 4/2020 | Sullivan | G06F 40/106 |

* cited by examiner

*Primary Examiner* — Nathan Hillery
(74) *Attorney, Agent, or Firm* — Mintz Levin Cohn Ferris Glovsky and Popeo, P.C.

(57) ABSTRACT

Aspects of the current subject matter provide for core data service model-based webpage generation that occurs at compile time. A specialized webpage, based on metadata consumed by and interpreted by the model, is generated at compile time, thus resulting in improved performance speeds compared to that for runtime webpage generation as a reduced amount of code is transferred to the client. The compile time webpage generation provides for extensibility to be shifted to a single source of truth, the core data service (CDS) model at which compile time webpage generation is implemented.

21 Claims, 5 Drawing Sheets

CORE DATA SERVICE-BASED COMPILE TIME WEBPAGE GENERATION

FIELD

The present disclosure generally relates to user interface and/or webpage generation and, more specifically, to compile time user interface and/or webpage generation.

BACKGROUND

Metadata compiled with a model may be used to generate a user interface and/or a webpage. For example, an application developer may create a model containing metadata, and the metadata may be processed to render the user interface and/or the webpage based on the consumed metadata. Performance issues, such as time, are a significant factor for such user interface and/or webpage generation.

SUMMARY

Methods, systems, and articles of manufacture, including computer program products, are provided for compile time webpage generation with a core data service based model.

According to an aspect, a computer-implemented method includes generating, at a core data service server and at build time, a model exposable to a client device in communication over a network with the core data service server, the model including logic characterizing a webpage to be rendered for the client device; receiving, by the core data service server and at build time from the client device, metadata relating to the webpage to be rendered at the client device; and compiling, by the core data service server and at compile time, the metadata with the model to generate the webpage, the webpage generated based on the metadata and specific to the model.

According to an inter-related aspect, a system includes at least one data processor and at least one memory storing instructions which, when executed by the at least one data processor, result in operations including generating, at build time, a model exposable to a client device in communication over a network with the at least one data processor, the model including logic characterizing a webpage to be rendered for the client device; receiving, at build time from the client device, metadata relating to the webpage to be rendered at the client device; and compiling, at compile time, the metadata with the model to generate the webpage, the webpage generated based on the metadata and specific to the model.

According to an inter-related aspect, a non-transitory computer-readable storage medium includes program code, which when executed by at least one data processor, causes operations including generating, at a core data service server and at build time, a model exposable to a client device in communication over a network with the core data service server, the model including logic characterizing a webpage to be rendered for the client device; receiving, by the core data service server and at build time from the client device, metadata relating to the webpage to be rendered at the client device; and compiling, by the core data service server and at compile time, the metadata with the model to generate the webpage, the webpage generated based on the metadata and specific to the model.

In some variations, one or more of the features disclosed herein including the following features can optionally be included in any feasible combination. The core data service server may receive from the client device a runtime request for the webpage, and the core data service server may provide the webpage to the client device at runtime. The core data service server may provide an open data protocol service for communication between the core data service server and the client device. The logic characterizing the webpage may include one or more of HTML code and JavaScript code. Compiling the metadata with the model may include executing the one or more of the HTML code and the JavaScript code with the metadata. The core data service server may receive from the client device an extension to the model. The core data service server may recompile, at compile time, the metadata with the model and the extension the model to generate an updated version of the webpage. Compiling the metadata with the model at compile time may be based on a level of complexity of the model, where the level of complexity is associated with a time for generating the webpage. The level of complexity may be predefined and/or user-modifiable, and the level of complexity may be based on an estimated period of time for the model to generate the webpage.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

Aspects of the current subject matter are directed to a compile time approach for webpage generation. In particular, aspects of the current subject matter provide for core data service (CDS) model-based webpage generation that occurs at compile time. According to implementations consistent with implementations of the current subject matter, webpage generation may also herein refer to user interface (UI) generation.

Metadata compiled with a model may be used to generate a webpage. For example, an application developer may create a model (e.g., a model of a user interface, client application, process, and the like) containing metadata, and the model may be executed by, for example, a processor to render the webpage based on the consumed metadata. In the case of runtime webpage generation, the metadata information may be consumed by the model at runtime to render the webpage. In this approach, the rendering of the webpage is done such that a generic webpage is generated so that the webpage is applicable to a plurality of models.

For example, a framework (e.g., SAP Fiori elements framework) may be provided for runtime webpage generation in which the client is decoupled from the server. This approach is limited, however, in that a large amount of code (e.g., JavaScript code) is transferred to a client so that interpretation of the model happens on the client side, resulting in undesirable initial load times (e.g., in the 5-10 seconds range in some instances). Moreover, mobile devices in particular are not powerful enough to provide a seamless experience. The issues with runtime webpage generation are particularly exacerbated for complex user interfaces, for which interpretation of metadata during runtime is impractical. In another example, runtime webpage generation may be used in a cloud application programming (CAP) model, a programming model that writes applications on the cloud. Customers may build their own servers with the cloud application programming model and expose data such that for webpage generation, a transfer of metadata to the customer is required. This approach also suffers with respect to time as interpretation of the metadata results in producing delays.

Aspects of the current subject matter provide for compile time webpage generation, in which the interpretation of the model is implemented at compile time. Consistent with implementations of the current subject matter, a specialized webpage, based on the metadata of the model, is generated at compile time, thus resulting in a reduced amount of code (e.g., compared to that for runtime webpage generation) being transferred to the client. As the webpage is generated at compile time, there is no need to interpret the model at runtime, resulting in improved performance with respect to time.

Compile time webpage generation, according to aspects of the current subject matter, also provides for extensibility to be shifted to a single source of truth, for example a core data service (CDS) model at which compile time webpage generation is implemented. For example, for a webpage to be adapted and/or adjusted, adjustments require extensibility that is not available through only modification of metadata. According to aspects of the current subject matter, custom front-end coding may be written by separating generated artifacts from well-defined extension points, leading to an improvement in developer efficiency.

Aspects of the current subject matter may be implemented in a core data service (CDS) model. The core data service model may include an infrastructure that can be used by database developers to create the underlying (e.g., persistent) data model, which application services expose to user interface clients. The database developer can define the data-persistence and transformations thereof and analytic models that are used to expose data in response to client requests. With the core data service model, a database model can be defined that includes objects such as tables, views, and structured types. The database objects can specify what data to make accessible for consumption by applications and how.

Compile time webpage generation using the core data service model, according to aspects of the current subject matter, may be implemented in a cloud computing environment. An open data protocol service (OData service) and representational state transfer (REST) interface may be used for communication in the cloud computing environment, as further described herein. OData service may be configured for building and consuming RESTful application programming interfaces (APIs). REST is a software architecture that defines a set of constraints for creating various web services. Web services conforming to the REST architecture may be referred to as RESTful web services. These services may be configured to provide interoperability between various computing systems on a network (e.g., the Internet). RESTful web services may further allow access and/or manipulation of textual representations of web resources using a uniform and/or predefined set of stateless operations.

Figure 1:
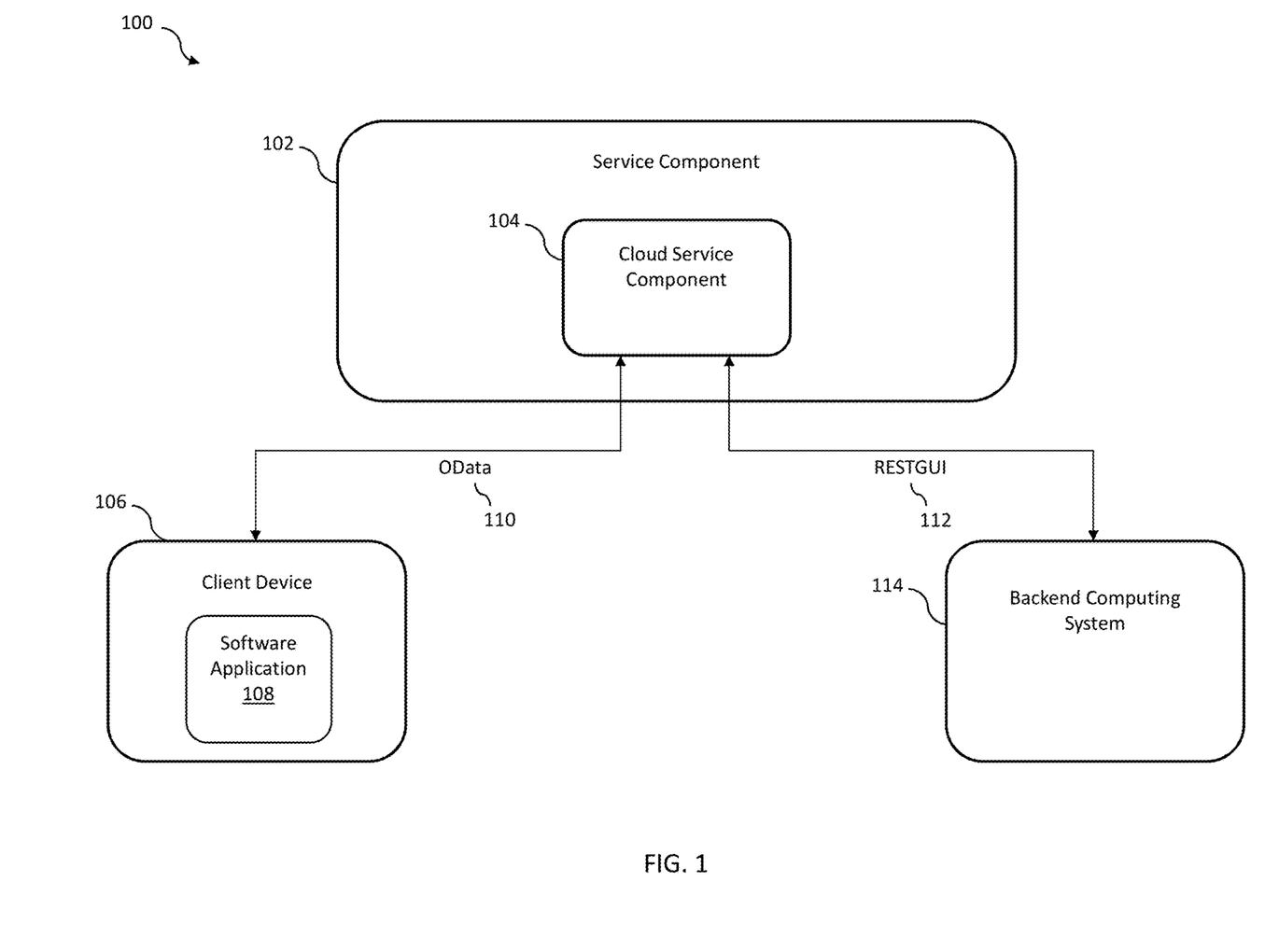
FIG. 1 is a block diagram illustrating an environment in which aspects of the current subject matter may be implemented.

FIG. 1 illustrates an exemplary cloud computing environment 100 for compile time webpage generation, according to some implementations of the current subject matter. The cloud computing environment 100 may include a service component 102 that may include a cloud service component 104, a client device 106 that may be configured to execute a software application 108, and a backend computing system 114. The software application 108 may be designed for execution as a mobile application on a mobile computing device, and/or as an application for execution on a non-mobile computing device.

The client device 106 may be any computing device (e.g., a personal computer, a server, a cellular telephone, a smartphone, a tablet, a personal digital assistant, etc.), a plurality of computing devices (networked or otherwise), a server, a plurality of servers (networked or otherwise), a storage location, a database, and/or any other devices and/or any combination thereof. In some exemplary implementations, the client device 106 may include HTML rendering capabilities, JavaScript running/execution capabilities, and/or can perform any other functionalities. The client device 106 may include software, hardware, and/or any combination thereof capable of performing at least one transaction related to software application 108. For example, the transaction may include transmitting an HTTP request to a server for an HTML page for presentation at the client device 106 (e.g., displaying in a user interface of the software application 108 the HTML page in a browser application). The client device 106 may also perform any type of transactions, which may include interactions with the service component 102 and/or any other third parties and/or third party applications. The interactions may implement use of the OData protocol 110.

The service component 102 may be any computing device (e.g., a personal computer, a server, a cellular telephone, a smartphone, a tablet, a personal digital assistant, etc.), a plurality of computing devices (networked or otherwise), a server, a plurality of servers (networked or otherwise), a storage location, a database, a data center, and/or any other devices and/or any combination thereof. The service component 102 may include software, hardware and/or any combination thereof that can provide applications, data, and/or any other information to the client device 106. The applications, data, and/or information provided by the service component 102 may be used for the implementation of compile time webpage generation and/or for transactions executed and/or recorded by the software application 108. The service component 102 may include a cloud service component 104 (e.g., an OData service) that may be used for communicating information between the software application 108 and the backend computing system 114. The service component 102 may also store various information associated with the software application 108 and/or compile time webpage generation aspects according to aspects of the current subject matter.

The backend computing system 112 may be any computing device (e.g., a personal computer, a server, a cellular telephone, a smartphone, a tablet, a personal digital assistant, etc.), a plurality of computing devices (networked or otherwise), a server, a plurality of servers (networked or otherwise), a storage location, a database, a data center, and/or any other devices and/or any combination thereof. The backend computing system 112 may be configured to provide various operations with respect to compile time webpage generation for the software application 108. The backend computing system 112 may also process various data/information collected by the software application 108. The backend computing system 112 may be configured to store various information/data/computing routines for compile time webpage generation. In some exemplary implementations, the backend computing system 112 may be configured to communicate with the service component 102 using the REST communication protocol. In some implementations, the REST communication protocol may be used connect the backend computing system 114 and the client device 106.

The components 102, 106, and/or 114 may be any type of wireless network, wired network, metropolitan area network ("MAN"), wide area network ("WAN"), local area network ("LAN"), virtual local area network ("VLAN"), Internet, intranet, extranet, and/or any other type of network, and/or any combination thereof.

As described herein, metadata may be consumed or interpreted by a model to generate a webpage. For example, the metadata may be contained in one or more metadata files and may include objects such as tables, views, and structure types. Database developers may create the underlying data model, which can be exposed to user interface clients (e.g., the client device 106). As the interpretation of the model is implemented at compile time, a specialized webpage is generated at compile time. The model is thus used to create the webpage, resulting a smaller footprint compared to that of a runtime generated webpage which requires interpretation of the metadata at runtime.

Figure 2:
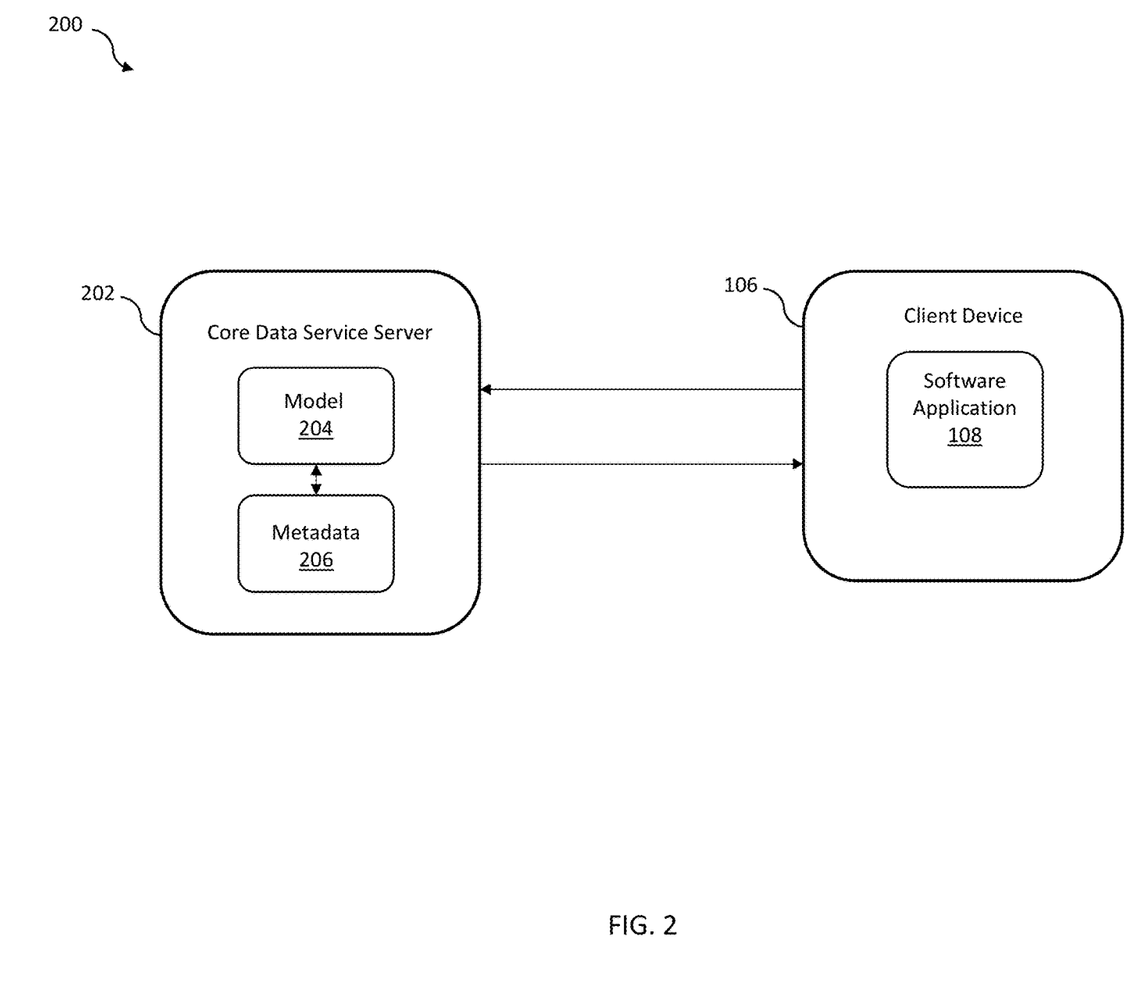
FIG. 2 is a block diagram depicting aspects of compile time webpage generation consistent with implementations of the current subject matter.

Consistent with implementations of the current subject matter, a core data service model is generated at a core data service server, and metadata files are compiled with the core data service model at compile time to generate a webpage. The core data service model includes logic and/or instructions that characterize the webpage, and by interpreting the metadata at the core data service model, the webpage may be generated. The metadata may include one or more files and/or data that includes fields, maps, labels, links, and/or the like. At compile time, the metadata is read by the core data service model for rendering the webpage. For example, the metadata is read to identify the fields, maps, labels, links, and/or the like, and is interpreted by the core data service model to generate the webpage defined by the logic and/or instructions that characterize the webpage. The logic and/or instructions define characteristics of the webpage, for example, placement and/or location of data, interaction aspects, views, and other features. Thus, aspects of the current subject matter provide a highly specialized webpage that is generated at compile time FIG. 2 is a block diagram 200 depicting aspects of compile time webpage generation consistent with implementations of the current subject matter. A core data service server 202, which may be part of the service component 102 and/or the cloud service component 104 shown in and described with respect to FIG. 1, is provided and is in communication with the client device 106 containing the software application 108. The core data service server 202 may provide an open data (OData) protocol service for communication between the core data service server 202 and the client device 106.

A model 204 (e.g., a core data service model) may be generated at build time by the core data service server 202. The model 204 is, according to aspects of the current subject matter, exposable to the client device 106 and includes logic and/or instructions characterizing a webpage to be rendered for the client device 106. For example, the model 204 may include objects, such as tables, views, and structured types, that specify what data to make accessible for consumption by applications and how. The model 204 may be generated at build time.

Metadata 206 may be provided by the client device 106 to the core data service server 202. The metadata, according to aspects of the current subject matter, includes data for the webpage to be rendered at the client device 106 with the model 204. For example, the metadata may include one or more files and/or data that includes fields, maps, labels, links, and/or the like. The metadata may be provided at build time by the client device 106.

At compile time, the model 204 consumes the metadata 206 for compiling the metadata 206 to generate the webpage based on the metadata and specific to the model. A command or instruction may be initiated at the client device 106 for receiving the webpage. For example, the command or instruction may be initiated by selection of a button or the like on a user interface. Other commands or instructions may be initiated. Upon receipt of the command or instruction, the webpage, that was generated at compile time, is provided to the client device 106 at runtime.

Figure 3:
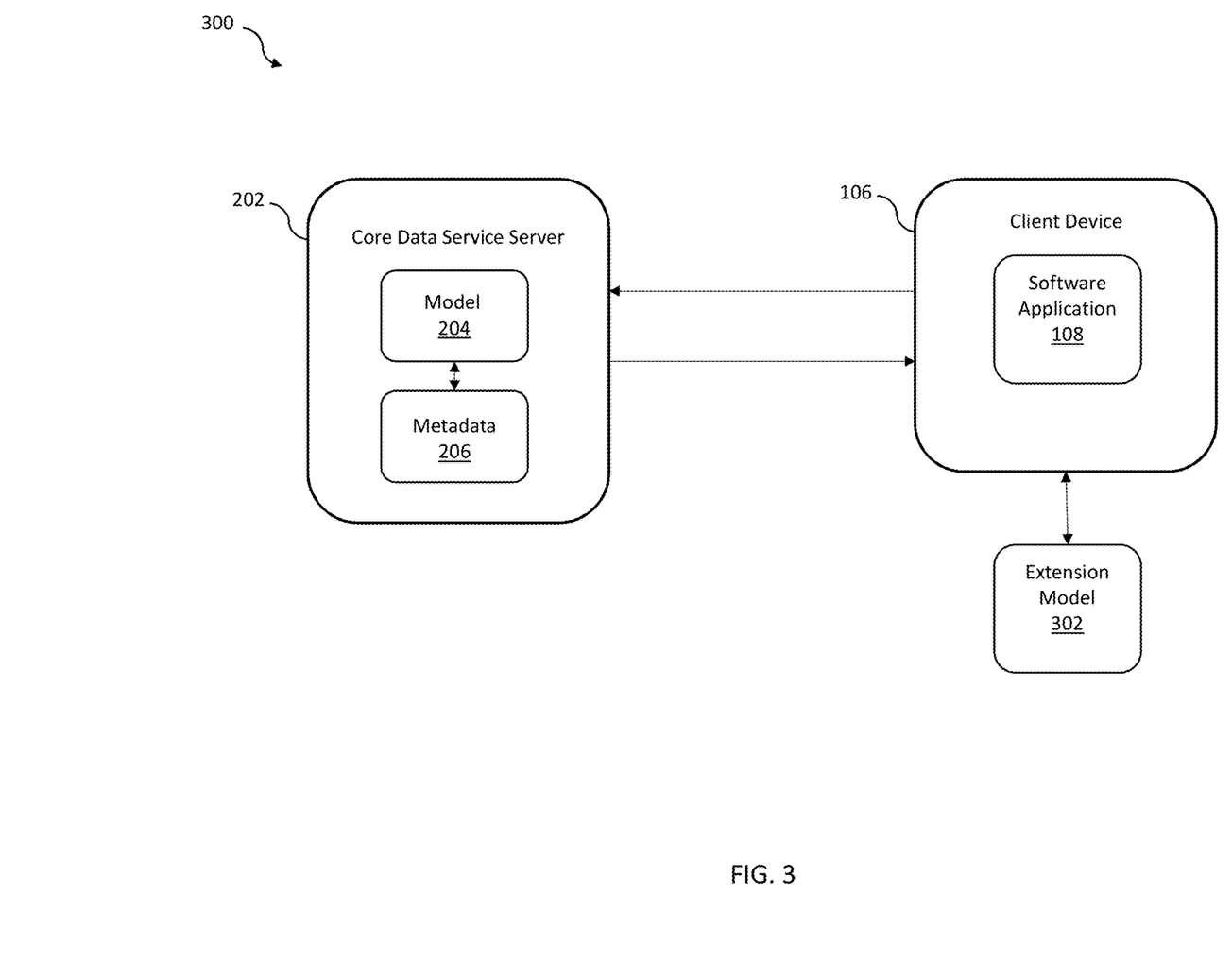
FIG. 3 is a block diagram depicting aspects of compile time webpage generation consistent with implementations of the current subject matter.

FIG. 3 is a block diagram 300 depicting aspects of compile time webpage generation consistent with implementations of the current subject matter. In addition to the core data service server 202, the model 204, the metadata 206, and the client device 106 with the software application 208 illustrated in and described with reference to FIG. 2, the block diagram 300 also includes an extension model 302. The extension model 302, according to aspects of the current subject matter, allows for a customer to client an extension that may include modifications, such as additions or other changes to the model 204. For example, there may be a need to change labels and/or fields, and the extension model 302 provides for such changes to be applied and incorporated to the model 204. Consistent with implementations of the current subject matter, the core data service server 202 may receive from the client device 106 the extension model 302 and may recompile the metadata 206 with the model 204 and the extension model 302 to generate an updated version of the webpage. In some implementations, the extension model 302 may be plugged into the model 204 to update the model 204. The updated version of the webpage may be provided to the client device 106 upon a subsequent runtime request from the client device 106.

Table 1 provides an example of a model, such as the model 204 that may be a core data service model generated at build time by the core data service server 202. The model is defined and includes relationships between entities.

TABLE 1

```
// db/schema.cds
entity MyDatabaseEntity {
    key ID : UUID;
        @label : name
        name : String;
        @label : age
        age : Integer;
        toOther : Association to MyOtherDatabaseEntity;
}
entity MyOtherDatabaseEntity {
```

TABLE 1-continued

```
    key ID : UUID;
        @label : color
        color : String;
}
```

Table 2 provides an example of service definitions. For example, according to aspects of the current subject matter, the service is defined to indicate what will be exposed to the client device 106.

TABLE 2

```
// srv/service.cds
using {
    MyDatabaseEntity,
    MyOtherDatabaseEntity
} from '../db/schema';
service MyService {
    entity MyServiceEntity        as projection on MyDatabaseEntity;
    entity MyOtherServiceEntity   as projection on MyOtherDatabaseEntity;
}
```

Table 3 provides an example of user interface annotations, which indicate how the data will be presented on the generated webpage (or user interface).

TABLE 3

```
// srv/annotations.cds
using {MyService} from './service';
annotate MyService.MyServiceEntity with @(UI : {
            Identification : [{Value : name}],
            SelectionFields : [
            ID,
            name,
            age
            ],
            LineItem : [
            {Value : ID},
            {Value : name},
            {Value : age}
            ]
});
annotate MyService.MyOtherServiceEntity with @(UI : {
            Identification : [{Value : color}],
            SelectionFields : [
            ID,
            color
            ],
            LineItem : [
            {Value : ID},
            {Value : color}
            ]
});
```

Table 4 provides an example the metadata files, such as the metadata 206, that is used for the webpage generation.

TABLE 4

```
// resulting metadata.xml
<?xml version="1.0" encoding="utf-8"?>
<edmx:Edmx Version="1.0"
xmlns:edmx="http://schemas.microsoft.com/ado/2007/06/edmx"
xmlns:m="http://schemas.microsoft.com/ado/2007/08/dataservices/metadata
" xmlns:sap="http://www.sap.com/Protocols/SAPData">
        <edmx:Reference Uri="https://sap.github.io/odata-
vocabularies/vocabularies/Common.xml" xmlns:edmx="http://docs.oasis-
open.org/odata/ns/edmx">
        <edmx:Include Alias="Common"
Namespace="com.sap.vocabularies.Common.v1"/>
    </edmx:Reference>
    <edmx:Reference Uri="https://sap.github.io/odata-
```

TABLE 4-continued

```
vocabularies/vocabularies/UI.xml" xmlns:edmx="http://docs.oasis-
open.org/odata/ns/edmx">
        <edmx:Include Alias="UI" Namespace="com.sap.vocabularies.UI.v1"/>
    </edmx:Reference>
    <edmx:DataServices m:DataServiceVersion="2.0">
        <Schema Namespace="MyService"
xmlns="http://schemas.microsoft.com/ado/2008/09/edm">
            <Entitycontainer Name="EntityContainer"
m:IsDefaultEntityContainer="true">
                <EntitySet Name="MyOtherServiceEntity"
EntityType="MyService.MyOtherServiceEntity"/>
                <EntitySet Name="MyServiceEntity"
EntityType="MyService.MyServiceEntity"/>
                <AssociationSet Name="MyServiceEntity_toOther"
Association="MyService.MyServiceEntity_toOther">
                    <End Role="MyServiceEntity" EntitySet="MyServiceEntity"/>
                    <End Role="MyOtherServiceEntity"
EntitySet="MyOtherServiceEntity"/>
                </AssociationSet>
            </EntityContainer>
            <EntityType Name="MyOtherServiceEntity">
                <Key>
                    <PropertyRef Name="ID"/>
                </Key>
                <Property Name="ID" Type="Edm.Guid" Nullable="false"/>
                <Property Name="color" Type="Edm.String"/>
            </EntityType>
            <EntityType Name="MyServiceEntity">
                <Key>
                    <PropertyRef Name="ID"/>
                </Key>
                <Property Name="ID" Type="Edm.Guid" Nullable="false"/>
                <Property Name="name" Type="Edm.String"/>
                <Property Name="age" Type="Edm.Int32"/>
                <NavigationProperty Name="toOther"
Relationship="MyService.MyServiceEntity_toOther"
FromRole="MyServiceEntity" ToRole="MyOtherServiceEntity"/>
                <Property Name="toOther_ID" Type="Edm.Guid"/>
            </EntityType>
            <Association Name="MyServiceEntity_toOther">
                <End Role="MyServiceEntity" Type="MyService.MyServiceEntity"
Multiplicity="*"/>
                <End Role="MyOtherServiceEntity"
Type="MyService.MyOtherServiceEntity" Multiplicity="0..1"/>
                <ReferentialConstraint>
                    <Principal Role="MyOtherServiceEntity">
                        <PropertyRef Name="ID"/>
                    </Principal>
                    <Dependent Role="MyServiceEntity">
                        <PropertyRef Name="toOther_ID"/>
                    </Dependent>
                </ReferentialConstraint>
            </Association>
            <Annotations Target="MyService.MyOtherServiceEntity"
xmlns="http://docs.oasis-open.org/odata/ns/edm">
                <Annotation Term="UI.Identification">
                    <Collection>
                        <Record Type="UI.DataField">
                            <PropertyValue Property="Value" Path="color"/>
                        </Record>
                    </Collection>
                </Annotation>
                <Annotation Term="UI.LineItem">
                    <Collection>
                        <Record Type="UI.DataField">
                            <PropertyValue Property="Value" Path="ID"/>
                        </Record>
                        <Record Type="UI.DataField">
                            <PropertyValue Property="Value" Path="color"/>
                        </Record>
                    </Collection>
                </Annotation>
                <Annotation Term="UI.SelectionFields">
                    <Collection>
                        <PropertyPath>ID</PropertyPath>
                        <PropertyPath>color</PropertyPath>
                    </Collection>
                </Annotation>
            </Annotations>
            <Annotations Target="MyService.MyOtherServiceEntity/color"
```

TABLE 4-continued

```
xmlns="http://docs.oasis-open.org/odata/ns/edm">
            <Annotation Term="Common.Label" Path="color"/>
        </Annotations>
        <Annotations Target="MyService.MyServiceEntity"
xmlns="http://docs.oasis-open.org/odata/ns/edm">
            <Annotation Term="UI.Identification">
                <Collection>
                    <Record Type="UI.DataField">
                        <PropertyValue Property="Value" Path="name"/>
                    </Record>
                </Collection>
            </Annotation>
            <Annotation Term="UI.LineItem">
                <Collection>
                    <Record Type="UI.DataField">
                        <PropertyValue Property="Value" Path="ID"/>
                    </Record>
                    <Record Type="UI.DataField">
                        <PropertyValue Property="Value" Path="name"/>
                    </Record>
                    <Record Type="UI.DataField">
                        <PropertyValue Property="Value" Path="age"/>
                    </Record>
                </Collection>
            </Annotation>
            <Annotation Term="UI.SelectionFields">
                <Collection>
                    <PropertyPath>ID</PropertyPath>
                    <PropertyPath>name</PropertyPath>
                    <PropertyPath>age</PropertyPath>
                </Collection>
            </Annotation>
        </Annotations>
        <Annotations Target="MyService.MyServiceEntity/name"
xmlns="http://docs.oasis-open.org/odata/ns/edm">
            <Annotation Term="Common.Label" Path="name"/>
        </Annotations>
        <Annotations Target="MyService.MyServiceEntity/age"
xmlns="http://docs.oasis-open.org/odata/ns/edm">
            <Annotation Term="Common.Label" Path="age"/>
        </Annotations>
    </Schema>
  </edmx:DataServices>
</edmx:Edmx>
```

Figure 4:
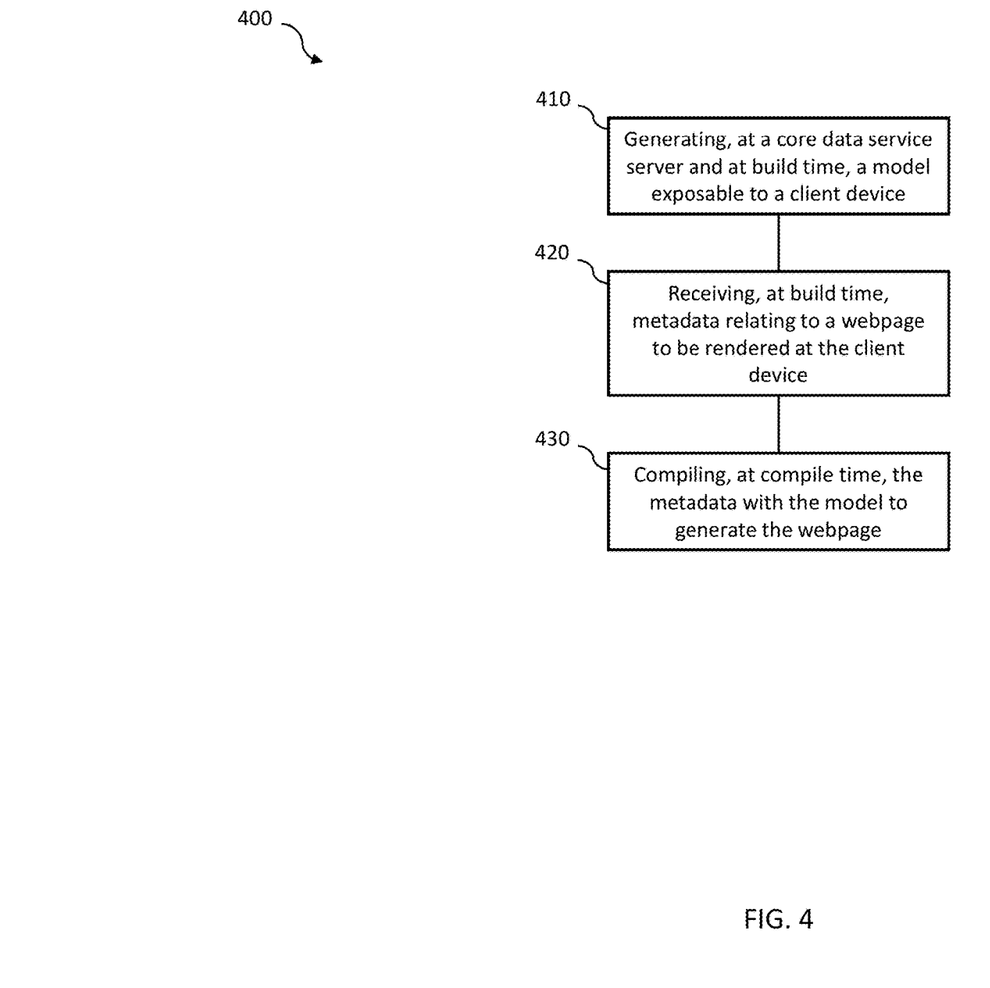
FIG. 4 depicts a flowchart illustrating a process for compile time webpage generation consistent with implementations of the current subject matter.

FIG. 4 depicts a flowchart 400 illustrating a process for compile time webpage generation consistent with implementations of the current subject matter.

At 410, at a core data service server (e.g., the core data service server 202) and at build time, a model is generated. The model (e.g., the model 204) is exposable to a client device (e.g., the client device 106), such that the model is accessible to the client device based on, for example, service definitions that may indicate what will be exposed to the client device 106. The client device is in communication over a network with the core data service server. The model includes logic and/or instructions characterizing a webpage to be rendered for the client device. Consistent with implementations of the current subject matter, the core data service server provides an open data (OData) protocol service for communication between the core data service server and the client device. In some implementations, the logic characterizing the webpage includes HTML code and/or JavaScript code.

At 420, metadata relating to a webpage to be rendered at the client device is received by the core data service server at build time from the client device. For example, the metadata may include one or more files and/or data that includes fields, maps, labels, links, and/or the like. The metadata may be compiled (e.g., consumed and/or interpreted) by the model to render the webpage.

At 430, at compile time, the core data service server compiles the metadata with the model to generate the webpage. According to aspects of the current subject matter, the webpage generated at compile time is based on the metadata and is specific to the model. That is, the webpage is a specialized webpage for the client device and is generated in advance of runtime, eliminating the potential for time delays if generated at runtime. In some implementations, the logic characterizing the webpage includes HTML code and/or JavaScript code, and compiling the metadata with the model includes execution of the HTML code and/or the JavaScript code with the metadata.

The client device may initiate a runtime request for the webpage, the initiated request being sent to the core data service server. As the webpage was generated at compile time, upon receiving the runtime request, the core data service server provides or sends the webpage to the client device.

In some implementations, generating the webpage at compile time may be based on a level of complexity of the model. For example, in some situations, a simple model may be able to compile the metadata at runtime without significant time issues, while a more complex model may encounter significant time issues. The level of complexity of the model may be associated with an amount of time needed for generating the webpage. For example, a time value may be defined, and if the amount of time needed to generate the webpage exceeds the defined time value, the model may be categorized as having a high level of complexity. If the amount of time needed to generate the webpage equals or is less than the defined time value, the model may be categorized as having a low level of complexity. Models having a high level of complexity may be designated to generate resultant webpages at compile time, while models having a low level of complexity may be designated to generate resultant webpages at runtime. The time value may be defined at the server side or the client side, and may in some instances be modifiable (e.g., modifiable by the client or customer). The level of complexity may be defined and associated with the model (e.g., coded with the model) at build time, thus defining in some instances when the webpage generated from the model should be implemented (e.g., compile time or runtime). For example, when the model is built, an estimated period of time for the model to generate the webpage may be determined. The estimated period of time may be based on, for example, executing the model with test data. In some implementations, the estimated period of time may be based on known timing variables with certain instructions and/or logic of the model. For example, various instructions and/or logic may be associated with a particular amount of time, which may be used to generate an estimate of the amount of time needed for the model to generate the webpage.

In some implementations, the level of complexity of the model may not be time based or may not be exclusively based on time. For example, the level of complexity may be defined based on the types of instructions and/or logic of the model. Various instructions and/or logic may be associated with a particular value that is indicative of level of complexity, and if the values for a particular model exceed a defined value, then the model may be categorized as having a high level of complexity. If the values for the model equal or are less than the defined value, then the model may be categorized as having a low level of complexity. Models having a high level of complexity may be designated to generate resultant webpages at compile time, while models having a low level of complexity may be designated to generate resultant webpages at runtime.

In some implementations, the level of complexity may be based on time associated with generating the webpage and/or level of complexity of the instructions and/or logic of the model. For example, weights may be applied to the time associated with generating the webpage and/or the level of complexity of the instructions and/or logic of the model. The weights may be server and/or client defined, and may be modifiable.

In some implementations consistent with implementations of the current subject matter, the webpage is generated at compile time unless a selection is made for runtime webpage generation. The selection may be implemented at the client device or coded into the model.

Aspects of the current subject matter provide for core data service model-based webpage generation that occurs at compile time. A specialized webpage, based on metadata consumed by and interpreted by the model, is generated at compile time, thus resulting in improved performance speeds compared to that for runtime webpage generation as a reduced amount of code is transferred to the client. The compile time webpage generation provides for extensibility to be shifted to a single source of truth, the core data service (CDS) model at which compile time webpage generation is implemented.

Figure 5:
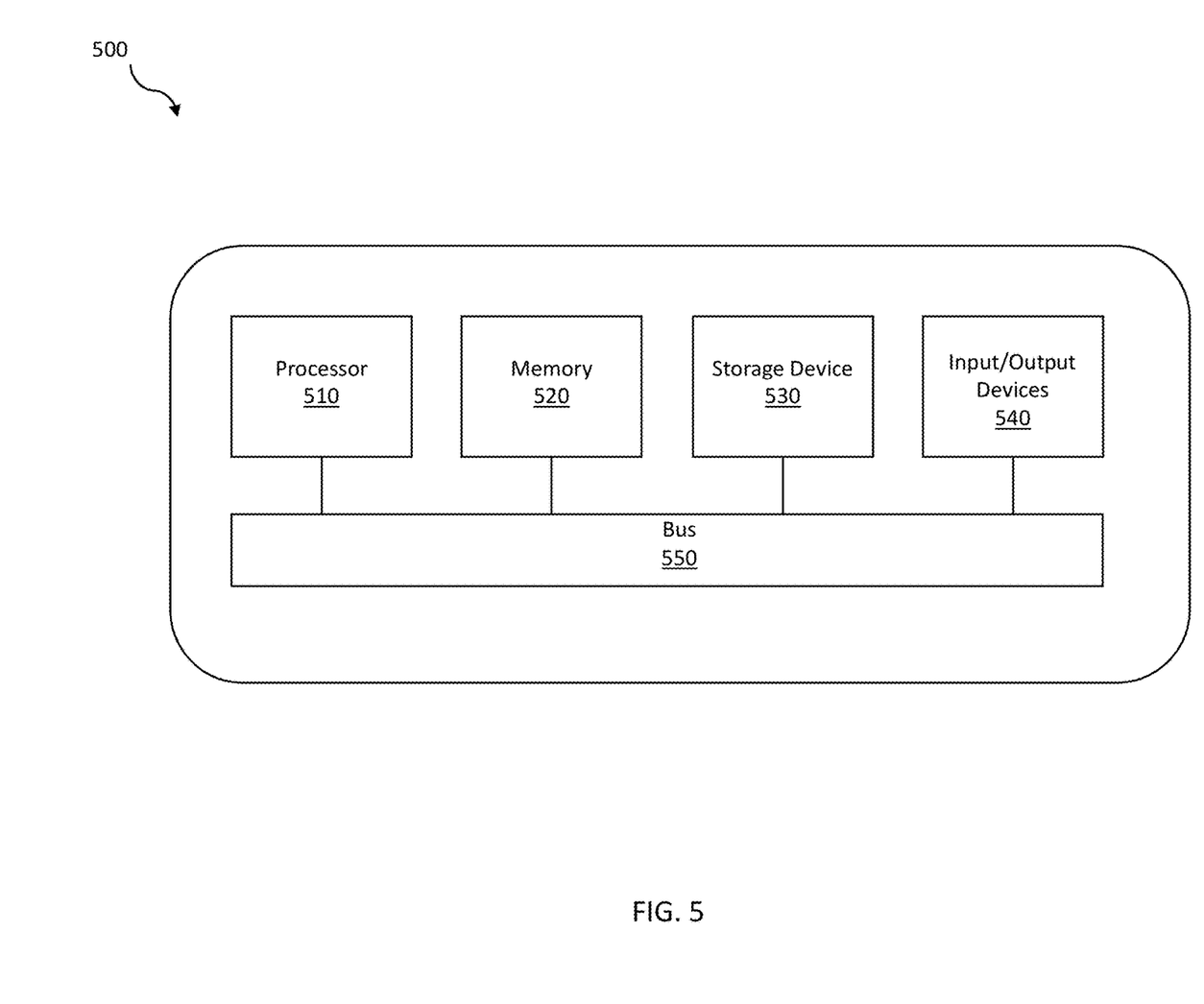
FIG. 5 depicts a block diagram illustrating a computing system consistent with implementations of the current subject matter.

FIG. 5 depicts a block diagram illustrating a computing system 500 consistent with implementations of the current subject matter. Referring to FIG. 1, FIG. 2, FIG. 3, and FIG. 5, the computing system 500 can be used to implement compile time webpage generation aspects of the current subject matter.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the cloud computing environment 100 and/or the core data service server 202. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
    generating, at a core data service server and at build time, a model exposable to a client device in communication over a network with the core data service server, the model comprising logic characterizing a webpage to be rendered for the client device;
    receiving, by the core data service server and at build time from the client device, metadata relating to the webpage to be rendered at the client device;
    compiling, by the core data service server and at compile time, the metadata with the model to generate the webpage, the webpage generated based on the metadata and specific to the model;
    receiving, by the core data service server and from the client device, an extension to the model; and
    recompiling, by the core data service server and at compile time, the metadata with the model and the extension to the model to generate an updated version of the webpage.

2. The computer-implemented method of claim 1, further comprising:
    receiving, by the core data service server and from the client device, a runtime request for the webpage; and
    providing, by the core data service server and to the client device at runtime, the webpage.

3. The computer-implemented method of claim 1, wherein the core data service server provides an open data protocol service for communication between the core data service server and the client device.

4. The computer-implemented method of claim 1, wherein the logic characterizing the webpage comprises one or more of HTML code and JavaScript code.

5. The computer-implemented method of claim 4, wherein compiling the metadata with the model comprises:
   executing the one or more of the HTML code and the JavaScript code with the metadata.

6. The computer-implemented method of claim 1, wherein compiling the metadata with the model at compile time is based on a level of complexity of the model, wherein the level of complexity is associated with a time for generating the webpage.

7. The computer-implemented method of claim 6, wherein the level of complexity is predefined and/or user-modifiable, and wherein the level of complexity is based on an estimated period of time for the model to generate the webpage.

8. A system, comprising:
   at least one data processor; and
   at least one memory storing instructions which, when executed by the at least one data processor, result in operations comprising:
     generating, at build time, a model exposable to a client device in communication over a network with the at least one data processor, the model comprising logic characterizing a webpage to be rendered for the client device;
     receiving, at build time from the client device, metadata relating to the webpage to be rendered at the client device;
     compiling, at compile time, the metadata with the model to generate the webpage, the webpage generated based on the metadata and specific to the model;
     receiving, by the core data service server and from the client device, an extension to the model; and
     recompiling, by the core data service server and at compile time, the metadata with the model and the extension to the model to generate an updated version of the webpage.

9. The system of claim 8, the operations further comprising:
   receiving, from the client device, a runtime request for the webpage; and
   providing, to the client device at runtime, the webpage.

10. The system of claim 8, wherein an open data protocol service is provided for communication between the at least one data processor and the client device.

11. The system of claim 8, wherein the logic characterizing the webpage comprises one or more of HTML code and JavaScript code.

12. The system of claim 11, wherein compiling the metadata with the model comprises:
   executing the one or more of the HTML code and the JavaScript code with the metadata.

13. The system of claim 8, wherein compiling the metadata with the model at compile time is based on a level of complexity of the model, wherein the level of complexity is associated with a time for generating the webpage.

14. The system of claim 13, wherein the level of complexity is predefined and/or user-modifiable, and wherein the level of complexity is based on an estimated period of time for the model to generate the webpage.

15. A non-transitory computer-readable storage medium including program code, which when executed by at least one data processor, causes operations comprising:
   generating, at a core data service server and at build time, a model exposable to a client device in communication over a network with the core data service server, the model comprising logic characterizing a webpage to be rendered for the client device;
   receiving, by the core data service server and at build time from the client device, metadata relating to the webpage to be rendered at the client device;
   compiling, by the core data service server and at compile time, the metadata with the model to generate the webpage, the webpage generated based on the metadata and specific to the model;
   receiving, by the core data service server and from the client device, an extension to the model; and
   recompiling, by the core data service server and at compile time, the metadata with the model and the extension to the model to generate an updated version of the webpage.

16. The non-transitory computer-readable storage medium of claim 15, further causes operations comprising:
   receiving, by the core data service server and from the client device, a runtime request for the webpage; and
   providing, by the core data service server and to the client device at runtime, the webpage.

17. The non-transitory computer-readable storage medium of claim 15, wherein the core data service server provides an open data protocol service for communication between the core data service server and the client device.

18. The non-transitory computer-readable storage medium of claim 15, wherein the logic characterizing the webpage comprises one or more of HTML code and JavaScript code, and wherein compiling the metadata with the model further causes operations comprising:
   executing the one or more of the HTML code and the JavaScript code with the metadata.

19. The computer-implemented method of claim 1, wherein the extension to the model comprises a change, and wherein the computer-implemented method further comprises:
   providing, by the core data service server and to the client device at runtime, the recompiled updated version of the webpage.

20. The system of claim 8, wherein the extension to the model comprises a change, and wherein the operations further comprises:
   providing, by the core data service server and to the client device at runtime, the recompiled updated version of the webpage.

21. The non-transitory computer-readable storage medium of claim 15, wherein the extension to the model comprises a change, and wherein the non-transitory computer-readable storage medium further causes operations comprising:
   providing, by the core data service server and to the client device at runtime, the recompiled updated version of the webpage.

* * * * *